Dec. 21, 1948.   H. L. COTTINGHAM   2,456,865
FLEXIBLE WHEEL DRIVE

Filed Oct. 9, 1946   2 Sheets-Sheet 1

Inventor
Howard L. Cottingham.
By Clarence A. O'Brien
and Harvey B. Jacobson
Attorneys Dec. 21, 1948.   H. L. COTTINGHAM   2,456,865
FLEXIBLE WHEEL DRIVE
Filed Oct. 9, 1946   2 Sheets-Sheet 2
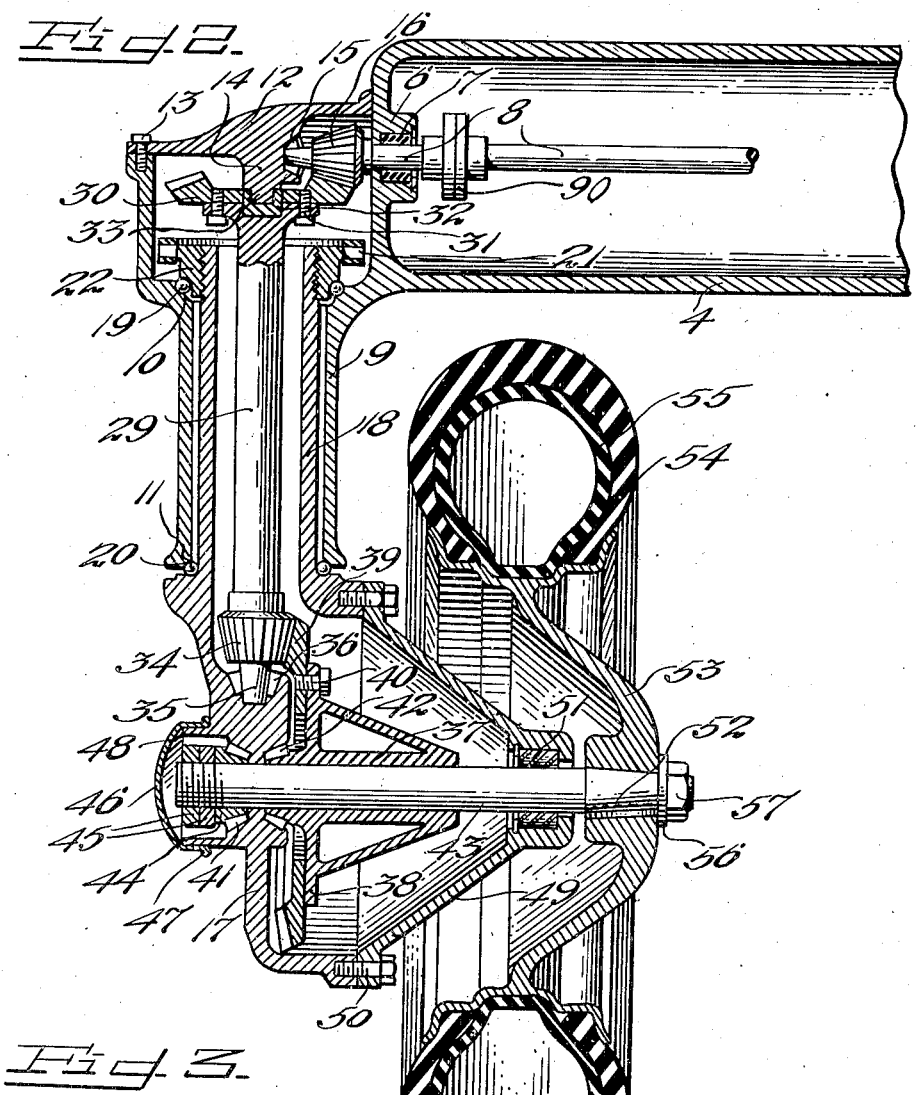
Inventor
Howard L. Cottingham.
By Clarence A. O'Brien
and Harvey B. Jacobson
Attorneys Patented Dec. 21, 1948

2,456,865

UNITED STATES PATENT OFFICE 2,456,865

FLEXIBLE WHEEL DRIVE

Howard L. Cottingham, Racine, Wis.

Application October 9, 1946, Serial No. 702,175

4 Claims. (Cl. 180—43)

This invention relates to improvements in flexible wheel drives for vehicles whereby the drive wheels of said vehicles may be steered.

An object of the invention is to provide an improved mechanism for driving and steering the front or rear drive wheels of any type of vehicle, but more especially a farm vehicle such as a self-propelled combine.

Another object of the invention is to provide an improved attachment for vehicles which will include means for driving the rear wheels and for steering the same simultaneously as they are driven.

A further object of the invention is to provide a vehicle with a transversely extending housing upon the ends of which are mounted depending rotatable wheel supporting columns or tubes with associated means for driving and steering said wheels from a remote point.

A further object of the invention is to provide a vehicle with a transversely extending housing at its rear end for supporting the improved flexible wheel drive mechanism which will be highly efficient in operation, and relatively inexpensive to manufacture and produce.

Other objects will appear as the description proceeds.

In the accompanying drawings which form a part of this application:

Figure 2 is a vertical sectional view through a rear drive wheel and associated driving and steering mechanism, and Figure 3 is a partial transverse sectional view showing the steering sprocket wheel with steering sprocket chain engaged thereabout.

Like characters of reference are used throughout the following specification and the accompanying drawings to designate corresponding parts.

Figure 1:
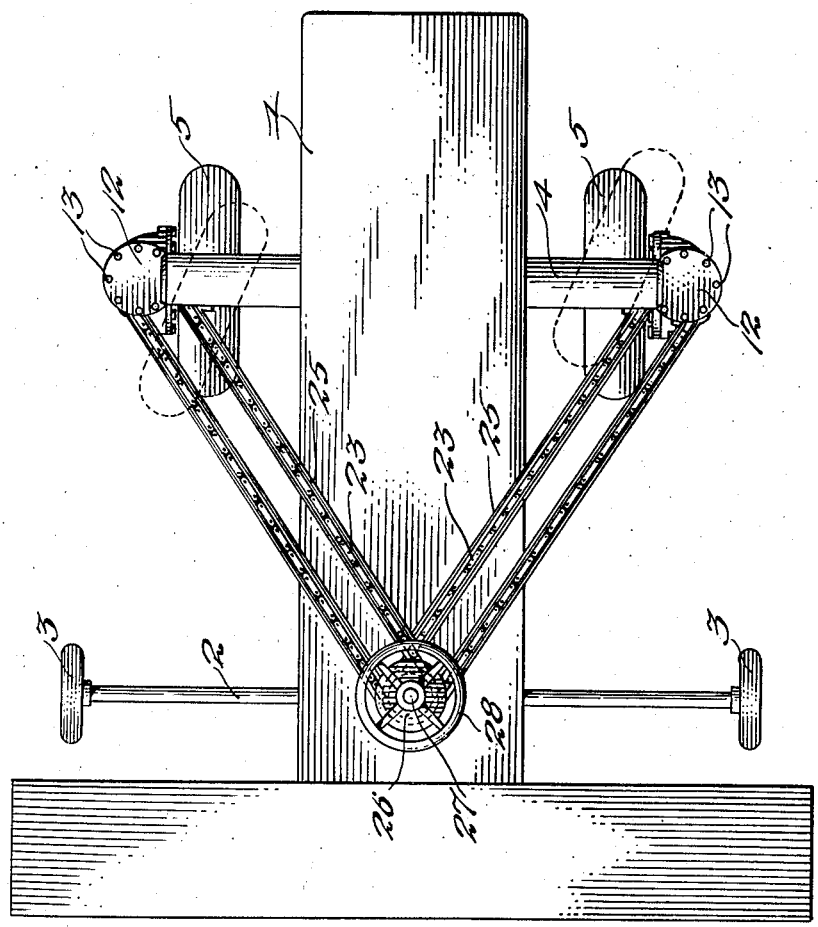
Figure 1 is a plan view representing the improved flexible wheel drive mechanism applied to a self-propelled combine.

In carrying out the invention, there is provided as shown in the drawings, a self-propelled combine generally denoted by the reference numeral 1, having a front axle 2 with front wheels 3, and a transversely extending fixed housing 4 attached adjacent the rear of said combine, upon which the rear wheels 5 will be supported.

The opposite ends of the housing or casing 4 are thickened as at 6 and are recessed to support the roller bearings 7, through which the drive shaft 8 extends. A coupling 90 will be connected between the sections of the shaft 8 which will be suitably connected to the driving engine (not shown).

The depending tubular gear casings 9 are formed integrally with the casing 4 at its opposite ends, and has the ball bearing races 10 and 11 formed in their upper and lower ends, respectively. The upper end of the casings 9 are enlarged, and are adapted to support the combined cover plates and bearing members 12 which are secured in position by the bolts 13. The members 12 are formed with the centrally disposed depending studs 14 which are laterally apertured to receive the roller bearings 15 which support the outer ends of a sectional drive shaft 8 upon which the bevel gears 16 are mounted. The lower gear casings 17 are formed with means for supporting the wheels 5 and include the vertically extending tubes 18 which are adapted to lie within the tubular gear casings 9 in spaced relation therewith, to support the ball bearings 19 and 20 in the races 10 and 11.

The sprocket wheels 21 are provided with the depending threaded collars 22 which are adapted to screw on the threaded upper ends of the tubes 18 to complete the races 10 and to furnish supports for the lower gear casings 17.

The sprocket chains 23 extend about the sprocket wheels 21 and pass the guide rollers 24 through the guard tubing 25 to a sprocket wheel 26 on the lower end of the steering shaft 27, which supports the steering wheel 28 on its upper end.

The vertically disposed driving shafts 29 are positioned within the tubular casings 18 and support the ring gears 30 on their upper ends, being attached thereto by the bolts 31 and intermeshing with the bevel gears 16. Axially disposed bearing sockets 32 are formed in the ring gears 30 and are disposed over the reduced ends 33 on the depending studs 14. The lower ends of the shafts 29 support the bevel gears 34 and have their lowermost ends tapered as at 35 to be received within the roller bearings 36 set in the lower casings 17.

Cone-shaped bearing heads 37 are formed with the annular flanges 38 upon which the ring gears 39 are secured by means of the bolts 40, said gears intermeshing with the bevel gears 34.

The lower portions of the lower gear casings 17 are reduced to support the oppositely disposed roller bearings 41 and 42, said bearing 42 supporting the tapered ends of the heads 37.

The wheel supporting shafts 43 extend transversely through the bearing heads 37 and through the roller bearings 42 and 41, and are externally threaded at their adjacent ends to receive the bearing cones 44 and the lock nuts 45. Dust caps 46 are formed with peripheral beads 47 and are adapted to fit over the laterally extending collars 48 formed on the lower bearing casings 17.

Cone shaped bearings members 49 are secured to the bearing casings 17 by means of the bolts 50, and are adapted to support the roller bearings 51 in their ends, said bearings being disposed over the wheel supporting shafts 43. The outer ends of the shafts 43 will be tapered at 52 and will support the wheels and rims 53, upon which the tire casings 54 and tubes 55 will be mounted. Washers 56 and nuts 57 will be placed with the outer ends of the shafts 43 to hold the wheels in position thereon.

From the foregoing description, it will be seen that there has been provided a highly efficient form of flexible wheel drive which may be incorporated in any type of vehicle, but for purposes of illustration has been shown incorporated in a self-propelled combine. It will be further seen that by the construction illustrated and described, the combine will be able to turn a sharp corner and to operate in the corners of a field which would otherwise be impossible to get to with the combines and steering mechanisms which are on the market today.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In combination with a vehicle, of a flexible wheel drive means therefor including a transversely disposed gear casing, a depending tubular gear casing supported on each end of said transverse gear casing, a combined cover plate and bearing member disposed on the upper end of each of said depending tubular gear casings, a drive shaft extending through each end of said transverse gear casing with the outer ends of each mounted for rotation in said cover plates and bearing members, a rotatable lower gear casing formed with a vertically extending tube extending through and supported by each of said depending tubular gear casings, a vertical driving shaft extending axially through each of said vertically extending tubes mounted for rotation between said combined cover plates and bearing members and said lower gear casings, bevel gears on the outer ends of said drive shafts, ring gears on the upper end of each vertical driving shaft intermeshed with said bevel gears, transverse wheel-supporting shafts rotatably mounted in each of said lower gear casings, wheels on the inner end of each of said wheel-supporting shafts, intermeshing bevel gears and ring gears mounted on the lower end of each of said vertical driving shafts and on said wheel-supporting shafts, respectively, and steering means disposed upon the upper ends of each of said vertically extending tubes.

2. In combination with a vehicle, of a flexible wheel drive means therefor including a transversely disposed gear casing, a depending tubular gear casing supported on each end of said transverse gear casing, a combined cover plate and bearing member disposed on the upper end of each of said depending tubular gear casings, a drive shaft extending through each end of said transverse gear casing with the outer ends of each mounted for rotation in said cover plates and bearing members, a rotatable lower gear casing formed with vertically extending tubes extending through and supported by each of said depending tubular gear casings, a vertical driving shaft extending axially through each of said vertically extending tubes mounted for rotation between said combined cover plates and bearing members and said lower gear casings, bevel gears on the outer ends of said drive shafts, ring gears on the upper end of each vertical driving shaft intermeshed with said bevel gears, transverse wheel supporting shafts rotatably mounted in each of said lower gear casings, wheels on the inner ends of each of said wheel supporting shafts, intermeshing bevel gears and ring gears mounted on the lower end of each of said vertical driving shafts and on said wheel-supporting shafts, respectively, ball bearing races disposed between and at the upper and lower ends of each of said depending tubular gear casings and the vertically extending tubes formed on said lower gear casings, and steering means disposed on the upper ends of each of said vertically extending tubes.

3. In combination with a vehicle, with a flexible wheel drive means therefor including a transversely disposed gear casing, a depending tubular gear casing supported on each end of said transverse gear casing, a combined cover plate and bearing member disposed on the upper end of each of said depending tubular gear casings, a drive shaft extending through each end of said transverse gear casing with the outer ends of each mounted for rotation in said cover plates and bearing members, a rotatable lower gear casing formed with vertically extending tubes extending through and supported by each of said depending tubular gear casings, a vertical driving shaft extending axially through each of said vertically extending tubes mounted for rotation between said combined cover plates and bearing members and said lower gear casings, bevel gears on the outer ends of said drive shafts, ring gears on the upper end of each vertical driving shaft intermeshed with said bevel gears, transverse wheel supporting shafts rotatably mounted in each of said lower gear casings, wheels on the inner ends of each of said wheel-supporting shafts, intermeshing bevel gears and ring gears mounted on the lower end of each of said vertical driving shafts and on said wheel supporting shafts respectively, ball bearing races disposed between and at the upper and lower ends of each of said depending tubular gear casings and the vertically extending tubes formed on said lower gear casings, a cone-shaped bearing bracket supported by each of said lower gear casings for supporting the inner ends of each of said wheel supporting shafts, and steering sprockets disposed on the upper ends of each of said vertically extending tubes.

4. In combination with a vehicle, of a flexible wheel drive means therefor including a transversely disposed gear casing, a depending tubular gear casing supported on each end of said transverse gear casing, a combined cover plate and bearing member disposed on the upper end of each of said depending tubular gear casings, a drive shaft extending through each end of said transverse gear casing with the outer ends of each mounted for rotation in said cover plates and bearing members, a rotatable lower gear casing formed with vertically extending tubes extending through and supported by each of said depending tubular gear casings, a vertical driving shaft extending axially through each of said vertically extending tubes mounted for rotation between said combined cover plates and bearing members and said lower gear casings, bevel gears on the outer ends of said drive shafts, ring gears on the upper end of each vertical driving shaft intermeshed with said bevel gears, transverse wheel-supporting shafts rotatably mounted in each of said lower gear casings, wheels on the inner ends of each of said wheel-supporting shafts, intermeshing bevel gears and ring gears mounted on the lower end of each of said vertical driving shafts and on said wheel-supporting shafts, respectively, ball bearing races disposed between and at the upper and lower ends of each of said depending tubular gear casings and the vertically extending tubes formed on said lower gear casings, a cone-shaped bearing bracket supported by each of said lower gear casings for supporting the inner ends of each of said wheel-supporting shafts, a bearing head secured to each of said wheel-supporting shafts forming a support for the ring gears intermeshed with the bevel gears on the lower ends of said vertical driving shafts, and steering sprockets on the upper ends of each of said vertically extending tubes.

HOWARD L. COTTINGHAM.

REFERENCES CITED

The following references are of record in the file of this patent:

UNITED STATES PATENTS

| Number | Name | Date |
|---|---|---|
| 1,405,159 | Polaski et al. | Jan. 31, 1922 |
| 1,515,815 | Roche | Nov. 18, 1924 |
| 1,958,997 | Harrison | May 15, 1934 |
| 2,299,150 | Kennedy | Oct. 20, 1942 |
| 2,335,597 | Mathewson | Nov. 30, 1943 |
| 2,376,419 | Cole | May 22, 1945 |